July 4, 1939.  A. T. MORGAN  2,164,339
MEANS FOR MEASURING TIP CLEARANCES OF STEAM TURBINES
Filed March 8, 1938
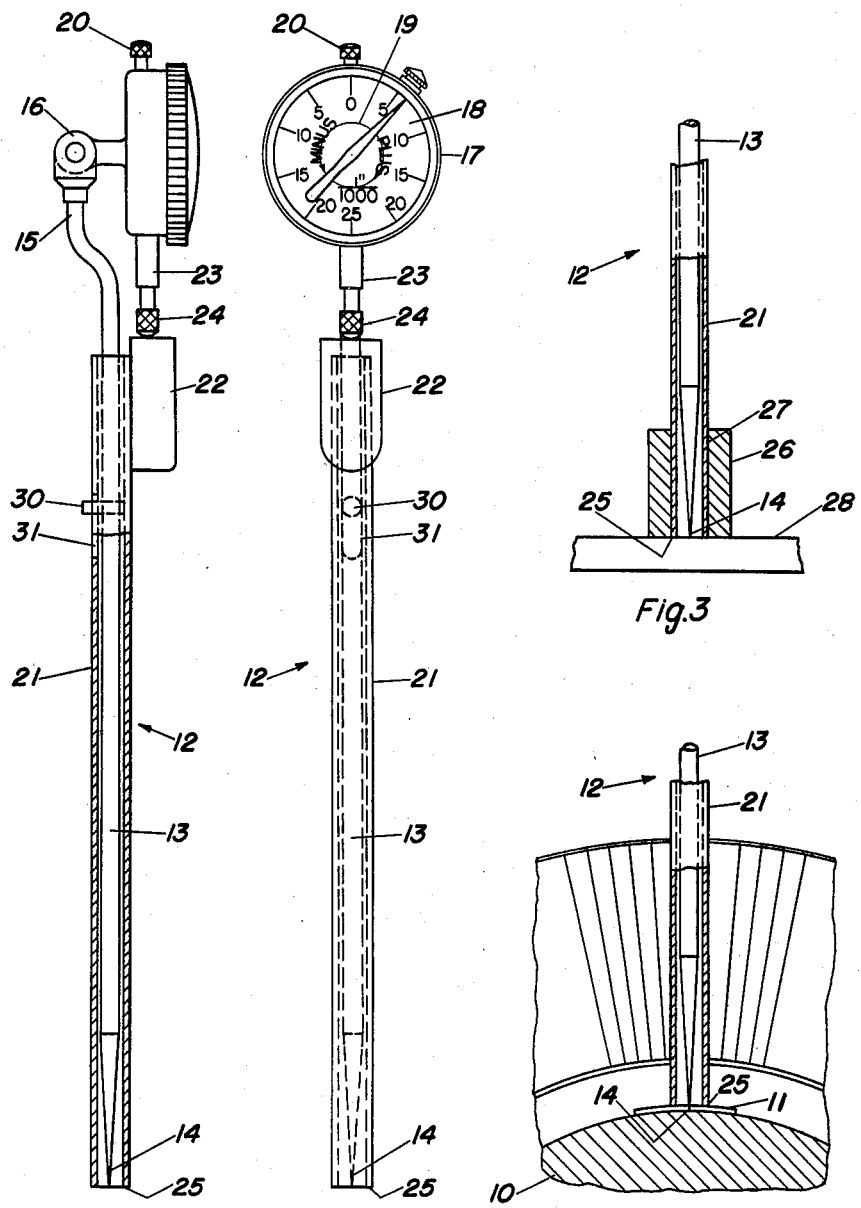
INVENTOR
ALBERT T. MORGAN
BY
ATTORNEY Patented July 4, 1939

2,164,339

UNITED STATES PATENT OFFICE 2,164,339

MEANS FOR MEASURING TIP CLEARANCES OF STEAM TURBINES

Albert T. Morgan, Vallejo, Calif.

Application March 8, 1938, Serial No. 194,712

1 Claim. (Cl. 33—169)

(Granted under the act of March 3, 1883, as amended April 30, 1928; 370 O. G. 757)

This invention relates to a means for measuring tip clearances of steam turbines, and has for an object to save time and to increase accuracy in measuring the tip clearances of steam turbines.

A further object of this invention is to provide an indicator particularly designed for use as part of the means for carrying out this invention.

With the foregoing and other objects in view, the invention consists in the construction, combination and arrangement of parts hereinafter described and illustrated in the drawing, in which, Fig. 1 is a front plan view of the indicator forming part of this invention.

Fig. 2 is a side plan view, partly in section, of Fig. 1.

Fig. 3 is a fragmentary view of a setting block for use in adjusting the indicator to zero position prior to taking measurements; and Fig. 4 is a fragmentary section of a turbine to which the end of the indicator is being applied for measuring purposes.

In taking wax prints for turbine blade tip clearances, melted wax is poured in the casing and on the rotor between each row of blades. The rotor is then lowered in the casing and the top half temporarily bolted down. The rotor is then revolved, the blade ends cutting away the surplus wax and leaving an unknown thickness of wax to be measured.

Under the old method of measuring the wax prints, it was necessary to remove the wax from between each row of blading and then measure with a micrometer. This work was tedious and required careful handling, especially where long blades were involved in order not to deform the wax prints, and necessitated the services of a skilled mechanic.

With this invention it is not necessary to remove the wax prints, thereby effecting a great saving in cost and time and also obtaining a more accurate reading. A skilled mechanic is not required and the wax after measuring can be removed by a helper.

The turbine rotor 10 has a wax print 11 formed thereon in the above described manner. Instead of removing this wax print 11 to measure the thickness, the thickness thereof is measured while in position by means of the micrometer indicator generally shown at 12. This indicator 12 consists of a hardened steel rod 13 having one end drawn to a sharp point 14, and the opposite end 15 is secured as at 16 to the back of a dial indicator 17 provided on its face with suitable indications 18 and an indicating needle 19 having a setting screw 20 for adjusting the needle 19 to zero position. The steel rod 13 extends through a steel tube 21 which is provided at its upper end with an attached steel block 22 adapted to contact with the indicator plunger 23 having an adjustable extension finger 24.

Before utilizing the indicator 12 on the wax print 11 it is desirable that the needle 19 be at the zero position when the rod point is in exact alignment with the end 25 of the tube 21. A setting block 26 having a cylindrical aperture 27 through which the tube 21 fits snugly is utilized. To set the indicator at zero the end 25 of the tube 21 is inserted in the aperture 27 of the setting block 26 which has been previously placed on a smooth, hard surface 28, thus permitting the point 14 to be brought into exact alignment with the end 25 of tube 21.

In order to keep the indicator plunger 23 in proper alignment over the plug 22, a key 30 may extend through the rod 13 and a slot 31 in the tube 21. When the rod point 14 and a tube end 25 are properly aligned, the plunger extension 24 may be adjusted until it is in contact with the top of the block 22. Then, if necessary, the setting screw 20 is manipulated to bring the needle 19 to the zero position. The indicator 12 is then placed with the tube end 25 on top of the wax print 11 and the rod point 14 is pressed through the wax print 11 until it contacts the rotor by pushing the indicator 17 downwardly. As this is done, the tube, resting on the wax print, through the steel block 22 and indicator plunger 23 causes the needle 19 to rotate from the zero position to exactly indicate the thickness of the wax print 11, enabling an accurate reading to be taken. Thereafter the wax print 11 may be removed in any suitable manner.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

A wax print thickness measuring device comprising a tube means, an abutment block on said tube means and a hardened pointed rod concentric within said tube means adapted to penetrate the wax print, indicator means for revealing the amount of movement of said rod relative to said tube means, said indicator means comprising an indicator dial secured on said rod, an indicator plunger depending from said dial, and means for adjusting said plunger comprising an indicator plunger extension on said plunger adapted to be extended to contact with said block at zero position.

ALBERT T. MORGAN.